United States Patent [19]
Rodi et al.

[11] Patent Number: 5,463,644
[45] Date of Patent: Oct. 31, 1995

[54] RESILIENT STORAGE SYSTEM

[75] Inventors: EuGene A. Rodi, Minneapolis; Ferris T. Price, deceased, late of Mayer, both of Minn., by Robert H. Price, legal representative

[73] Assignee: Unisys Corporation, Blue Bell, Pa.

[21] Appl. No.: 975,381

[22] Filed: Nov. 13, 1992

[51] Int. Cl.⁶ .................................................. G06F 11/10
[52] U.S. Cl. ................................. 371/40.4; 371/40.3
[58] Field of Search ....................... 371/40.4, 40.1, 371/40.2, 40.3, 37.4, 38.1

[56] References Cited

U.S. PATENT DOCUMENTS

| | | | |
|---|---|---|---|
| 4,775,978 | 10/1988 | Hartness | 371/40.1 |
| 4,809,278 | 2/1989 | Kim et al. | 371/51.1 |
| 4,989,210 | 1/1991 | Scheuneman et al. | 371/40.1 |
| 5,058,115 | 10/1991 | Blake et al. | 371/40.1 |

*Primary Examiner*—Stephen M. Baker
*Attorney, Agent, or Firm*—Nawrocki, Rooney & Sivertson

[57] ABSTRACT

A memory system providing capability for correction of multiple bit errors. The storage elements of the memory system are divided into four-bit nibbles, wherein storage of a single 32-word requires access to eight separate storage elements. A ninth storage element stores a four-bit error syndrome. All nine storage elements have single bit error correction/multiple bit error detection. All single bit errors are corrected directly within the individual storage element. Multiple bit errors within a single storage element are signaled to the interface controller which corrects the error using the stored four-bit error syndrome.

8 Claims, 6 Drawing Sheets

RESILIENT STORAGE SYSTEM

BACKGROUND OF THE INVENTION

1. Field of the Invention

The present invention relates generally to data processing system storage techniques and more particularly relates to memory storage systems having provisions for error detection and correction.

2. Description of the Prior Art

Errors within data processing equipment tend to occur from both transient causes and permanent failures. Because of the predominantly digital nature of the data processing system, such errors must be monitored to provide accurate and verifiable results. Some systems, such as described in U.S. Pat. No. 4,410,942, issued to Milligan et al., deal with this concern by detecting errors so that the effected process may be repeated, hopefully without error. U.S. Pat. Nos. 4,139,148 and 4,163,147, both issued to Scheuneman et al. and incorporated herein by reference, teach memory systems wherein errors may both be detected and corrected to prevent the need to repeat the process. In these systems, single bit errors may be corrected and double bit errors detected.

As non-volatile core memory gave way to the newer volatile semiconductor technologies, error detection and correction for memory storage systems became essential. U.S. Pat. Nos. 4,058,851 and 4,112,502, both issued to Scheuneman, describe ways of minimizing the memory access time penalties associated with such error detection and correction.

In addition to error control for memory systems, U.S. Pat. Nos. 4,652,993 and 4,962,501, issued to Scheuneman et al. and Byers et al. respectively, teach techniques for control of errors occurring in transfers within a bussed architecture. U.S. Pat. No. 4,757,440 issued to Scheuneman and U.S. Pat. Nos. 4,697,233 and 4,600,986, issued to Scheuneman et al.,. are directed to error control for both data and addressing of small temporary memory stacks.

The physical characteristics of the storage or transfer device undergoing error control most often determine the extent and the nature of the error detection and/or error correction method. U.S. Pat. No. 4,644,545, issued to Gershenson, proposes a special purpose error coding scheme especially adapted to disk systems. A tape system employing complete redundancy is suggested in U.S. Pat. No. 4,772,963, issued to Van Lahr et al. U.S. Pat. No. 4,745,605, issued to Goldman et al., shows error detection and classification of microcode control words. Memory module backup is provided in U.S. Pat. No. 4,849,978, issued to Dishon et al.

An early form of error control is through the use of complete redundancy. U.S. Pat. No. 4,228,496, issued to Katzman et al.; U.S. Pat. No. 5,099,485, issued to Bruckert et al.; and U.S. Pat. No. 4,942,575, issued to Earnshaw et al., show examples of memory systems employing complete redundancy. Except for certain specialized applications in the military and aerospace fields, such complete redundancy is seldom cost effective. In fact, for most systems, complete redundancy is even less effective than much less expensive techniques.

One method of enhancing overall system reliability which employs less than complete redundancy is through the use of a number of smaller modules combined to perform a larger function. In this manner, failure of a given module causes a reconfiguration resulting in diminished capacity but not loss of the entire resource. U.S. Pat. No. 4,772,085, issued to Flora et al., shows a storage subsystem utilizing a number of small disk drives to produce an effectively large storage capacity. An archival storage unit with fault tolerance is shown in U.S. Pat. No. 3,876,978, issued to Bossen et al.

As memory element technology has developed, the modularized approach has become the architectural standard. U.S. Pat. No. 5,117,428, issued to Jeppsesen, III et al., teaches a semiconductor memory subsystem which utilizes the modularity to provide expansion in both horizontal and vertical dimensions. Implementing modularized semiconductor memories offers the opportunity to provide on-chip error detection and correction as taught by Leslie in U.S. Pat. No. 4,739,504 and 4,739,585. This is also used in U.S. Pat. No. 4,993,028, issued to Hillis. System level implementation of large scale semiconductor memories is taught in U.S. Pat. No. 4,633,434, issued to Scheuneman and U.S. Pat. No. 5,060,145, issued to Scheuneman et al., both incorporated herein by reference.

An addressing scheme employing error checking for such a large scale memory is taught in U.S. Pat. No. 4,727,510, issued to Scheuneman et al. Error correction of the address word is also provided in U.S. Pat. No. 4,092,713, issued to Scheuneman. Correction of the address word is shown in U.S. Pat. No. 4,918,695 and U.S. Pat. No. 4,926,426, both issued to Scheuneman et al. U.S. Pat. No. 4,649,475, issued to Scheuneman and U.S. Pat. No. 4,918,696, issued to Purdham et al. show protection from control information failures.

Arrangement of the modules within the memory may have an impact upon the failure tolerance of the system. U.S. Pat. No. 5,128,941, issued to Russell, shows a memory system in which the module addressing is irregular. Effectiveness may also be enhanced through the use of multiple error control schemes. A technique employing both vertical and horizontal parity checking is suggested by U.S. Pat. No. 5,103,424, issued to Wade. U.S. Pat. No. 4,531,213, issued to Scheuneman, teaches embedding a first level error check within a second level check.

Though the prior art has many examples of efficient single bit error correction/double bit error detection, correction of multiple bit errors continues to be particularly troublesome. The most common methods of dealing with multiple bit errors in the prior art involve a loss of data. Those prior art systems which attempt to correct multiple bit errors without data loss tend to require substantial amounts of additional hardware.

SUMMARY OF THE INVENTION

The present invention overcomes the disadvantages of the prior art techniques by providing a highly resilient memory system which employs a minimum of redundancy. Fault tolerance is achieved through a modularized architecture employing a unique combination of on-card and system level error detection and correction.

In the preferred embodiment, the basic memory element is a dynamic random access memory (DRAM) chip. The DRAM chips are arranged on individual memory array cards such that each array card contains one four-bit "nibble" of any given 32-bit data word to be accessed. As with eight-bit bytes, a four-bit nibble is a multiple bit parallel data set. In that way a 32-bit data word is stored and read as an ordered set of eight four-bit nibbles, wherein each four-bit nibble comes from a different one of eight array cards. A memory interface circuit disassembles each 32-bit word into eight nibbles for the write operation and reassembles the eight nibbles for a corresponding read operation. A ninth array card provides storage for a redundant error detection and correction nibble.

Each of the nine array cards has internal capability for single bit error correction and double bit error detection provided by error detection and correction check bits, which are stored and accessed for every nibble stored and accessed on the array card. Therefore, any single bit error on an array card is corrected directly on the array card. For a given 32-bit word, up to one single bit error on each array card (i.e. up to nine bit errors) may be corrected in this way.

Multiple bit errors on a given array card are detected and indicated to the interface circuit for correction. Because the ninth array card stores error detection and correction check bits for each bit position within the nibble for all array cards, multiple bit errors on a single array card are easily corrected. In this way, all four bit positions on a given array card may be corrected, and the data may be recovered, even if a hard failure has completely destroyed all of the data on that array card. Assuming no further uncorrectable errors in the interim, the array card possessing the hard failure may be simply replaced without any loss to the system.

Other errors are detected and indicated to the requestor to permit retry or other corrective action.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
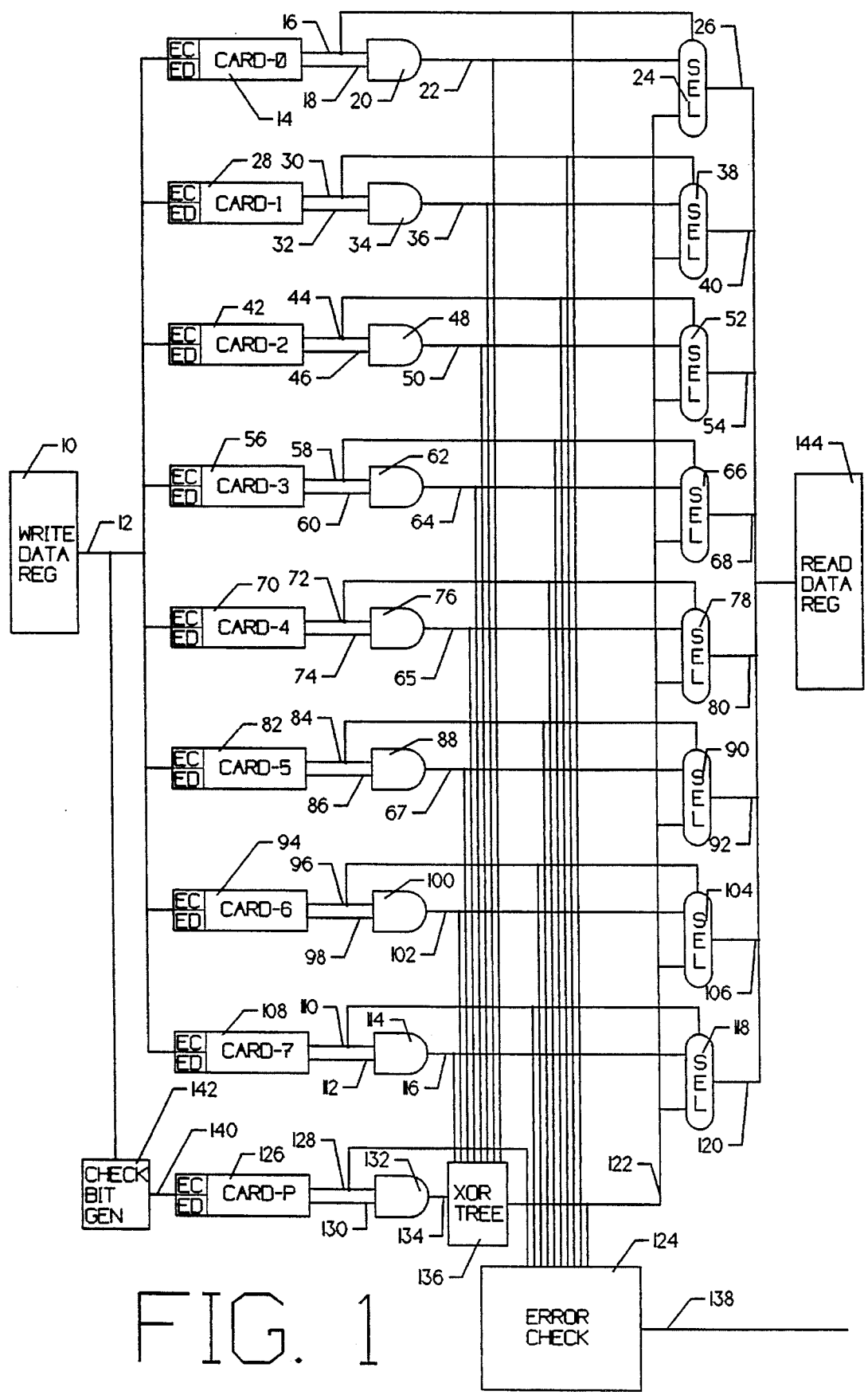
FIG. 1 is a conceptualized schematic diagram of the preferred embodiment of the present invention.

FIG. 1 is a conceptualized schematic diagram showing operation of the preferred embodiment of the present invention. Though the preferred embodiment specifically addresses error control of 32-bit words arranged as four-bit nibbles, those of skill in the art will readily appreciate how these teachings may be applied to systems employing other modulii.

Array cards 14, 28, 42, 56, 70, 82, 94, and 108 are individual memory modules wherein each contains storage for 32meg or more four-bit nibbles. The basic memory elements are dynamic random access memory (DRAM) chips. Each array card also contains a check bit generator and storage capacity for producing and storing single bit error correction/double bit error detection check bits corresponding to each four-bit nibble.

Write data register 10 buffers the entire 32-bit word to be written. The 32-bit word is divided by cable 12 into the eight four-bit nibbles. Each nibble is presented to the appropriate array card (i.e. bits 0–3 to array card 14, bits 4–7 to array card 28, etc.). All 32 bits are presented to check bit generator 142, which exclusively ours the input to each of the eight array cards at each of the four bit positions of the nibble. In this way, a single bit correction/multiple bit detection check bit is generated for each bit position of the nibble. This means that bit positions 0, 4, 8, 12, 16, 20, 24, and 28 are used to provide the first error correction bit. Check bit generator 142 generates the remaining three error correction bits in similar fashion. The four error correction bits are presented to array card 126 by cable 140. Array card 126 is identical to the other array cards, except that it is used to store four error correction bits rather than four-bit data nibbles.

Array cards 14, 28, 42, 56, 70, 82, 94, 108, and 126 are all similarly addressed during both data read and write operations in the manner known in the art utilizing circuitry not shown for clarity. For read operations, each array card is similarly addressed to access the four-bit nibble and corresponding check bits. Based upon these check bits, the four-bit nibble is checked for error directly on the array card. If a single bit error is present, the error is corrected on the array card before the data is transferred from the array card on the corresponding one of four-bit data output cables 18, 32, 46, 60, 74, 86, 98, 112, and 130. In this way, single bit errors can be corrected on any or all of the nine array cards, which may be up to nine separate single bit errors within the 32-bit data word and corresponding error code.

If no further errors are found on the array cards (i.e. no array card has detected more than one bit position in error), error control lines 16, 30, 44, 58, 72, 84, 96, 110, and 128 enable the corresponding corrected four-bit nibbled through the associated ones of and-gates 20, 34, 48, 62, 76, 88, 100, 114, and 132 on to lines 22, 36, 50, 64, 65, 67, 102, and 116, respectively. Similarly, the error control lines cause selectors 24, 38, 52, 66, 78, 90, 104, and 118 to select the correct eight four-bit nibbles from the array cards for reassembly into the 32-bit word. This reassembly occurs when four-bit cables 26, 40, 54, 68, 80, 92, 106, and 120 each present four data bits to read data register 144 in the proper bit positions. During the reassembly of the 32-bit data word, each of the eight four-bit nibbles is presented to correction circuit 136 for comparison with the check bit read from array card 126 and received via four-bit cable 134.

If any of the array cards contains a multiple bit error, that multiple bit error is detectable but not correctable on the array card. Such a multiple bit error on a single array card results in a change of state of the corresponding error control line. This disables the corresponding and-gate from transferring the uncorrected four-bit nibble to the associated selector. The same error control line causes the corresponding selector to select a corrected four-bit nibble present on cable 122.

The corrected four-bit nibble is presented to cable 122 by correction circuit 136. As indicated above, this correction is prepared through a comparison of the check bit stored in array card 126 with the check bit similarly generated from the data read from the array cards. This error correction scheme corrects double bit errors, even multiple bit errors, and odd multiple bit errors which map to undefined areas of the syndrome. For odd multiple bit errors which do not map to undefined areas of the syndrome, the errors cannot all be corrected and the data requestor is notified via error line 138. This signal signifies that the 32-bit data word in read data register 144 is incorrect and uncorrectable. The requestor must take appropriate remedial measures including rereading, etc.

Figure 2:
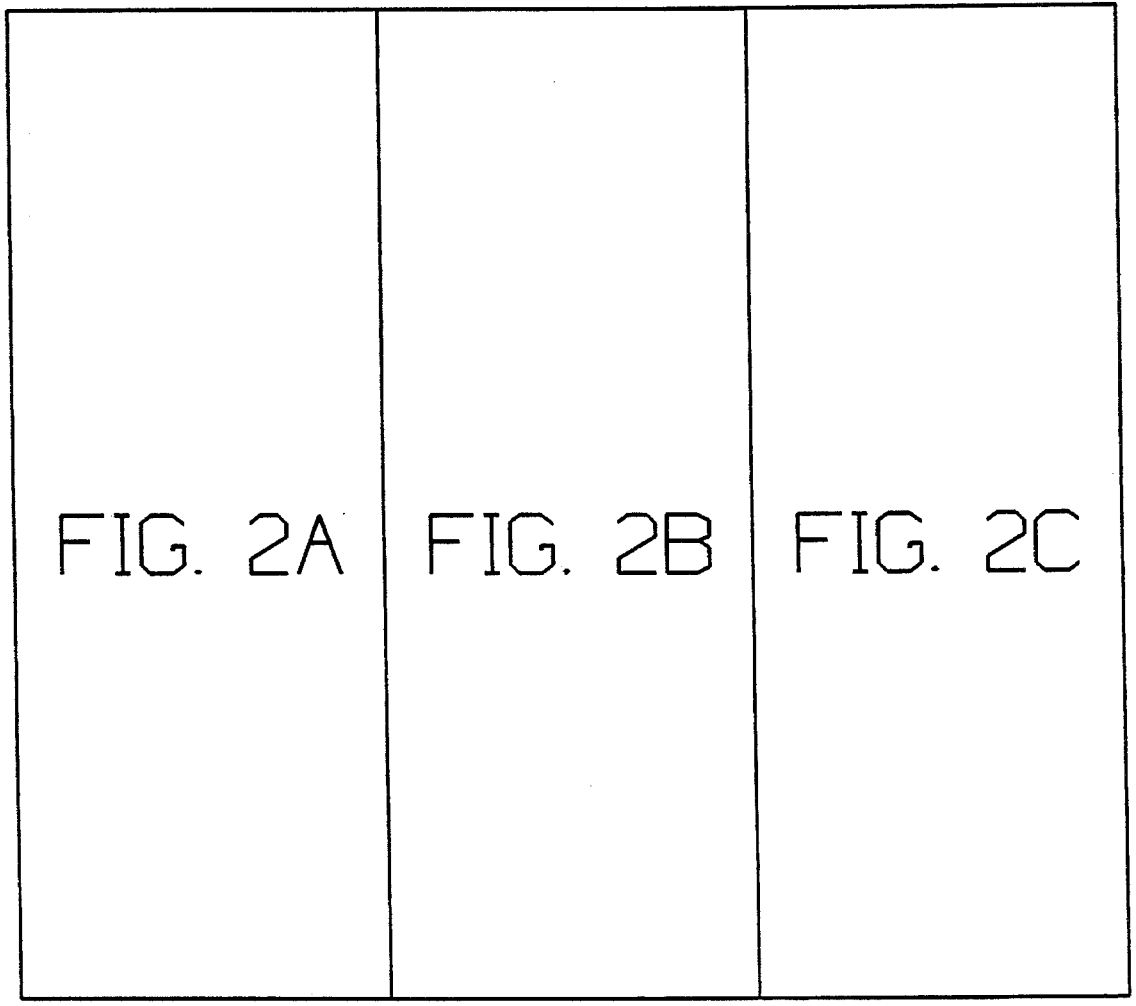
FIG. 2 is a composite block diagram of the preferred embodiment with the interface circuitry.
Figure 2A:
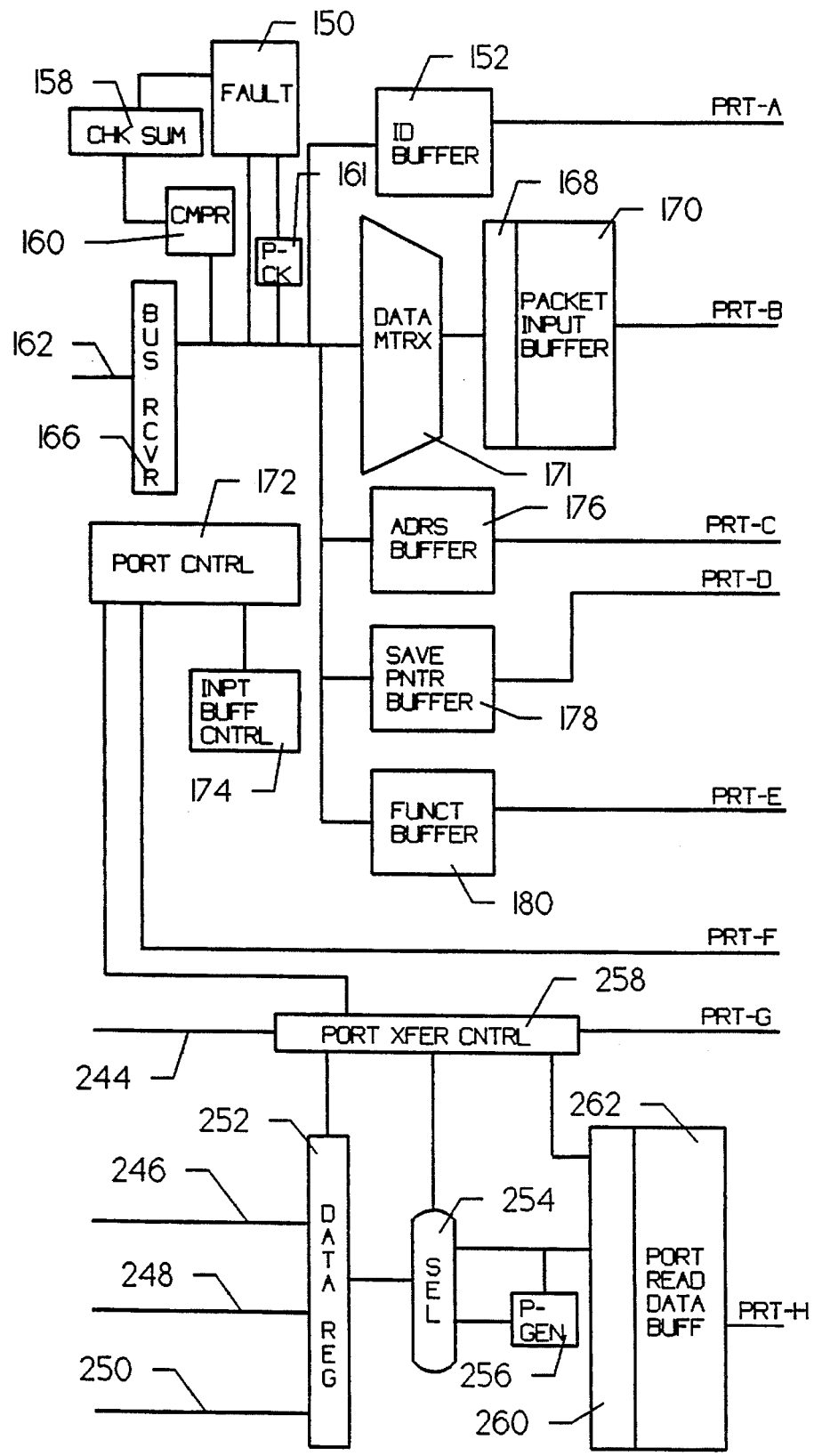
FIG. 2A is a detailed block diagram of the first portion of the composite block diagram shown in FIG. 2.
Figure 2B:
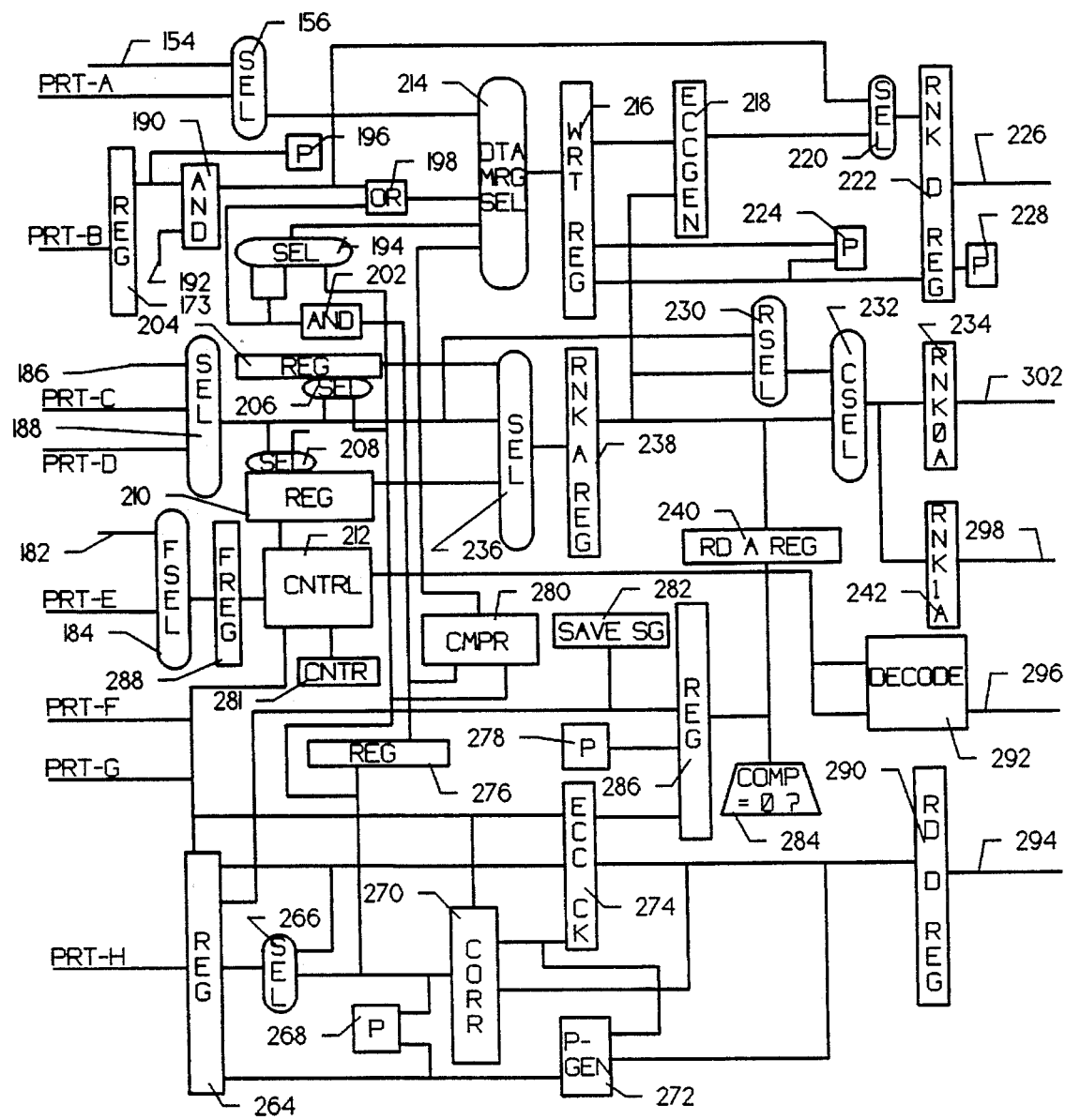
FIG. 2B is a detailed block diagram of the second portion of the composite block diagram shown in FIG. 2.
Figure 2C:
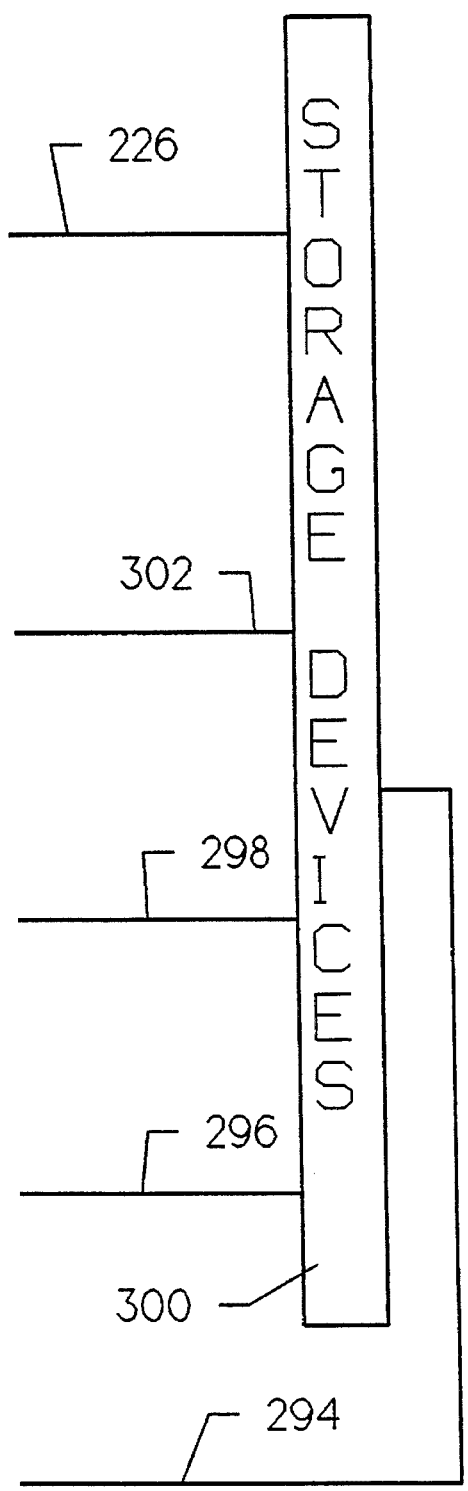
FIG. 2C is a detailed block diagram of the third portion of the composite block diagram shown in FIG. 2.

FIG. 2 is a functional block diagram for an actual memory system employing the present invention. This memory may be considered to be divided into Port Logic, Common Logic, and Storage. The Port Logic is the circuitry associated with interface to the users of the memory system. In the preferred mode and not to be deemed as limiting of the invention, the memory system has four separate access ports of which only the circuitry for one port is shown.

The Common Logic is that control logic which controls operation of the memory system for all accesses. These accesses may be in response to any of the four requestor ports. The Storage section of the preferred embodiment contains 160 DRAM storage devices and the associated drive and electrical interface circuitry.

A request packet is formed by a requestor of the memory system and presented to bus receivers 166 via bus coupling 162. Bus receivers 166 provide the level conversion to the internal electrical standards. Format of the incoming packet is verified by check sum circuit 158 and comparator 160, port fault circuit 150, and parity check circuit 161.

An eight bit requestor identification code is removed from the verified packet and buffered in ID buffer 152. Address buffer 176 temporarily stores the 32-bit address word of the request. Save/pointer buffer 178 is available to buffer a second address for those functions associated with a data move from one memory address to another. Eight bit function buffer 180 stores the code corresponding to the function to be performed.

For memory functions involving a memory write, the write data is formatted by data matrix 171 and buffered in packet input buffer 170 which can accommodate up to 16 40-bit words from each of two packets received on the associated port. Control of the individual port is provided by port control 172 and input buffer control 174. This provides orderly priority sequencing for use of the port. A priority request is made from the port to central controller 212 which takes a snapshot of all port requests and grants priority on a rotating basis. Port control 172 is notified of the grant of priority, which provides notification to port transfer control 258. In this way, an interface acknowledge is sent to the requestor via line 244 when priority has been granted. Upon grant of priority, central controller 212 starts various timing chains to control the requested function selected by selector 184 and held in function register 288.

For write functions, the data is transferred from packet input buffer 170 to RAM data register 173. At the proper time as determined by the enable on line 192, the data is gated by and-gate 190 to or-gate 198. Parity check 196 verifies the accuracy of this transfer. The write data may be mixed with data at or-gate 198 for partial word writes before selection by data merge selector 214. Write data register 216 stores the complete word selected. Selection is provided by the output of port priority selector 156 from ID buffer 152. Other ports provide selection data on cable 154. Data merge selector 214 may also assemble words prepared by rearrangement of bytes from data save register 276 using selector 194 and and-gate 202. From write data register, the write data word is sent via ecc generator 218 and selector 220 to RNK data register 222 for presentation to storage 300 via cable 226. Selector 220 permits bypassing of ecc generator 218 for diagnostic purposes. Validity of these transfers is maintained by parity check circuits 224 and 228.

The address for both read and write operations is temporarily stored in the Port Logic by address buffer 176. When priority has been granted, address selector 188 chooses the appropriate address. Addresses from other ports arrive via cable 186. The selected address is transferred to address save register 204 via selector 206 for complex functions such as "read-alter-write". The address is also transferred to address increment register 210 via selector 208 for multiple address operations such as block transfers. Selector 236 chooses the appropriate one of the current address, the address save register address, or the incremented address for transfer to RNK address register 238. From there, the selected address is transferred to ecc generator 218 and row/column selector 232 for array addressing. The row/column formatted address data is held by RNK0 address register 234 and presented via cable 302 to storage 300 during the access. Row selector 230 provides a by pass for transferring early row data. Because ecc codes verify both data and address information, the address for read functions is transferred to read address hold register 240 and read address register 286 for use by comparator 284 and ecc check circuit 274. Parity is verified by parity check 278.

The contents of function buffer 180 is transferred to function register 288 via selector 184 upon the grant of priority to the port. Function data from other ports arrives via cable 182. The selected eight-bit function code is provided to central control 212 for sequencing of the memory system. Incrementation counter 281 provides updated addressing control information for block transfers. Data incrementation and comparison circuitry 280 performs a similar function for the read data during complex read-alter-write functions.

Data and ecc which are read from storage 300 are transferred via bus 294 to read data register 290. This data is used to feed ecc check regeneration logic 274, parity generation logic 272, and single bit error data correction logic 270. The output of ecc check regeneration logic 274 is used to compare the ecc code from read data register 290 and produce the syndrome. This information is then used to either correct single bit errors or report multiple uncorrectable errors as discussed in detail above. The corrected data or diagnostic information is selected by selector 266 and transferred to read in register 264. Port read data buffers 260 and 262 provide the data to the individual ports. For the port shown, the data is selected by selector 254 and stored in data register 252 along with parity provided by parity generation and compare logic 256. The requestor receives the read data via bus 246. Parity is provided by line 248 and line 250 provides the valid data signal.

Figure 3:
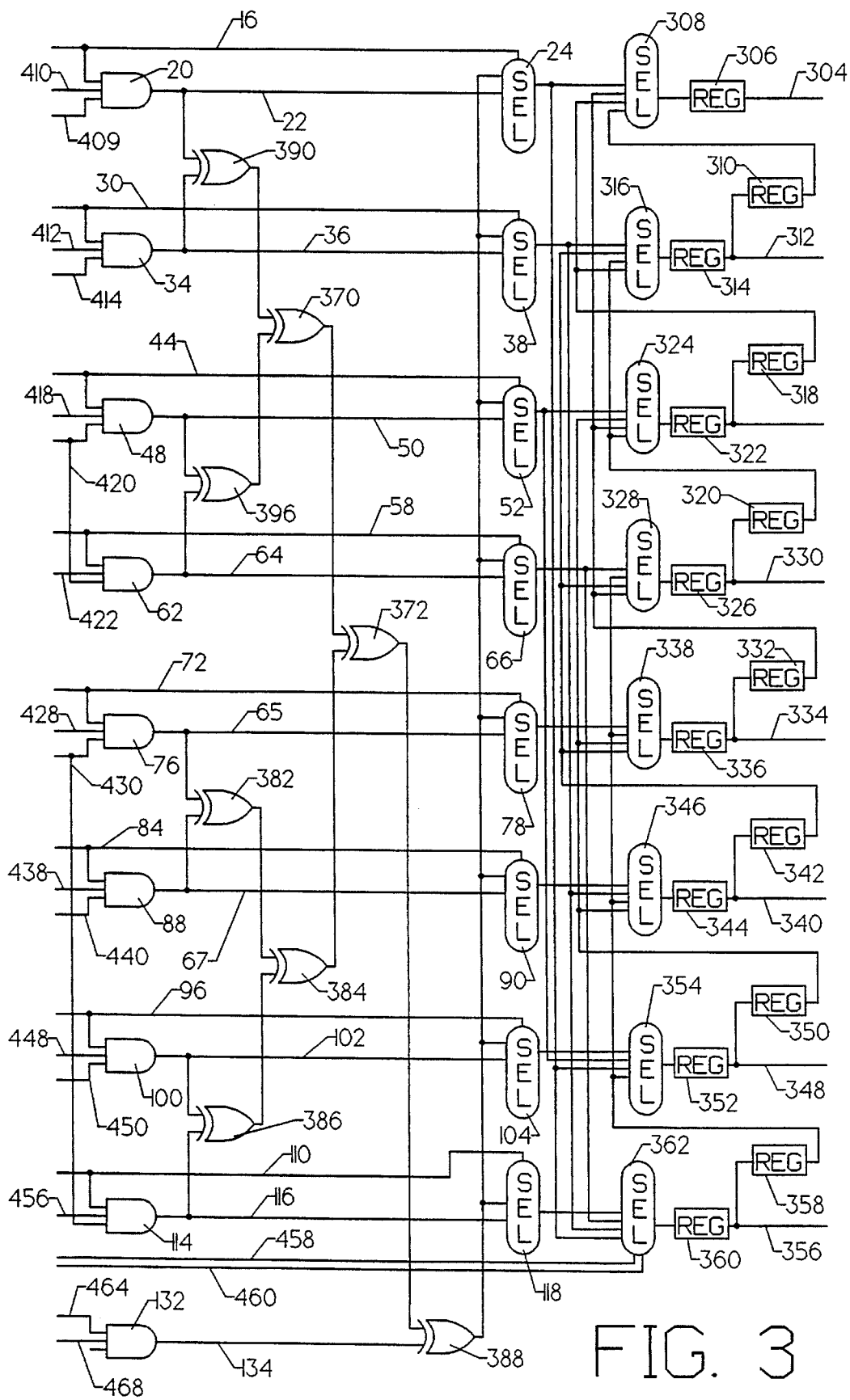
FIG. 3 is a schematic diagram showing the interface circuitry which assembles the read data and corrects multiple bit errors.

FIG. 3 is a schematic diagram showing the transfer of data from the array cards during a read operation through the error correction circuitry. Data from bit positions 0–3 arrive from array card 0 on lines 410. Lines 412 contain data from array card 1 for bit positions 4–7. Similarly, lines 418, lines 422, lines 428, lines 438, lines 448, and lines 456 convey the data from bit positions 8-11, 12-15, 16-19, 20-23, 24-27, and 28-31, respectively. And-gates 20, 34, 48, 62, 76, 88, 100, and 114 enable the data to selectors 24, 38, 52, 66, 78, 90, 104, and 118. if the arrays cards are installed and no multiple bit error has been detected on a single array card. Lines 16, 30, 44, 58, 72, 84, 96, and 110 transfer the multiple bit error control signal from the individual array cards. Lines 409, 414, 420, 430, 440, and 450 provide enables when the corresponding array cards are installed. This feature ensures that array cards can be replaced during operation of the memory system.

Assuming that lines 16, 30, 44, 58, 72, 84, 96, and 110 indicate that no array card contains a multiple bit uncorrectable error, selectors 24, 38, 52, 66, 78, 90, 104, and 118 select the data from the array cards for transfer through selectors 308, 316, 324, 328, 338, 346, 354, and 362 to four-bit nibble registers 306, 314, 322, 326, 336, 344, 352, and 360.

The error check bits stored on the ecc array card is provided to and-gate 132 via lines 468. Assuming not disabled by a multiple bit uncorrectable error as signified by line 464, the check bits are presented to or-gates 388 (i.e. one for each of the gates 388 combine with exclusive or-gates (i.e. separate for each of the four bit positions) 390, 396, 370, 372, 382, 386, and 384 for correction of any multiple bit error from a single array card. The corrected four bit nibble at the output of exclusive or-gates 388 is presented to each of the selectors 24, 38, 52, 66, 78, 90, 104, and 118 for selection by the corresponding multiple bit error signal on line 16, 30, 44, 58, 72, 84, 96, or 110.

Selectors 308, 316, 324, 328, 338, 346, 354, and 362, along with four-bit registers 310, 318, 320, 332, 342, 350, and 358, are used to assemble 32-bit data words when operating with a configuration that uses fewer array cards to store the data in multiple four-bit nibbles.

Having thus described the various aspects of the preferred mode of the present invention, those of skill in the art will be capable of readily applying the teachings found herein to yet other embodiments within the scope of the claims hereto attached.

We claim:

1. A memory apparatus for reading and writing a data word comprising:
   a. a plurality of memory array means wherein each of said plurality of memory array means stores a corresponding portion of the data word; each of said plurality of memory array means including an error detection means and an error correction means; said error correction means being for correcting single bit errors in said corresponding portion of the data word thereby providing a corresponding corrected data element; each of said plurality of memory array means being capable of detecting multiple bit errors in said corresponding portion of the data word and asserting a multiple bit error detection line if a multiple bit error is detected;
   b. a plurality of control means wherein each of said plurality of control means is coupled to a corresponding one of said plurality of memory array means; said plurality of control means receiving a corresponding corrected data element and further receiving a corresponding multiple bit error detection line;
   c. a plurality of selection means wherein each of said plurality of selection means is coupled to a corresponding one of said plurality of control means and is further coupled to a corresponding one of said plurality of memory array means; each of said plurality of selection means receiving a corresponding corrected data element and further receiving a corresponding multiple bit error detection line;

each of said plurality of control means providing said corresponding corrected data element to said corresponding one of said plurality of selection means when said corresponding multiple bit error detection line is not asserted; each of said plurality of control means providing a predetermined logic level to said corresponding one of said plurality of selection means when said corresponding multiple bit error detection line is asserted;
   d. a check bit generator means coupled to the data word for generating a plurality of error correction check bits;
   e. a redundant memory array means for storing said plurality of error correction check bits; said redundant memory array means including an error detection means and an error correction means; said error correction means for correcting single bit errors in a corresponding portion of said plurality of error correction check bits thereby providing a corresponding corrected check bit element;
   f. a redundant control means coupled to said redundant memory array means; said redundant control means receiving said corresponding corrected check bit element and further receiving a corresponding multiple bit error detection line from said redundant memory array means; said redundant control means providing said corrected check bit element when said corresponding multiple bit error detection line is not asserted; said redundant control means providing a predetermined logic level when said corresponding multiple bit error detection line is asserted; and
   g. an error correction means coupled to said plurality of control means, to said redundant control means, and to said plurality of selection means; said error correction means providing a system level corrected portion of the data word to said plurality of selection means; a corresponding one of said plurality of selection means selecting said system level corrected portion of the data word if said corresponding multiple bit error detection line is asserted and selecting said corresponding corrected data element if said corresponding multiple bit error detection line is not asserted.

2. A memory apparatus according to claim 1 further comprising:
   h. an error check means being coupled to said plurality of multiple bit error detection lines from said plurality of memory array means; said error check means for asserting an uncorrectable error line if more than one of the plurality of multiple bit error detection lines are asserted.

3. A memory apparatus according to claim 2 wherein said error correction means further comprises:
   i. at least one XOR means.

4. A memory apparatus according to claim 3 further comprising:
   j. a disassembling means coupled to said plurality of memory array means for disassembling the data word into at least one portion; said at least one portion of the data word being provided to corresponding memory array means.

5. A memory apparatus for reading and writing a data word comprising:
   a. a plurality of memory array cards wherein each of said plurality of memory array cards stores a corresponding portion of the data word; each of said plurality of memory array cards including an error detection circuit and an error correction circuit; said error correction circuit being for correcting single bit errors in said corresponding portion of the data word thereby providing a corresponding corrected data element; each of said plurality of array cards being capable of detecting multiple bit errors in said corresponding portion of the data word and asserting a multiple bit error detection line if a multiple bit error is detected;
   b. a plurality of AND elements wherein each of said plurality of AND elements is coupled to a corresponding one of said plurality of memory array cards; said plurality of AND elements receiving a corresponding corrected data element and further receiving a corresponding multiple bit error detection line;

c. a plurality of selection circuits wherein each of said plurality of selection circuits is coupled to a corresponding one of said plurality of AND elements and is further coupled to a corresponding one of said plurality of memory array cards; each of said plurality of selection circuits receiving a corresponding corrected data element and further receiving a corresponding multiple bit error detection line;

each of said plurality of AND elements providing said corresponding corrected data element to said corresponding one of said plurality of selection circuits when said corresponding multiple bit error detection lines is not asserted; each of said plurality of AND elements providing a predetermined logic level to said corresponding one of said plurality of selection circuits when said corresponding multiple bit error detection line is asserted;

d. a check bit generator coupled to the data word for generating a plurality of error correction check bits;

e. a redundant memory array card for storing said plurality of error correction check bits; said redundant memory array card including an error detection circuit and an error correction circuit; said error correction circuit being for correcting single bit errors in a corresponding portion of said plurality of error correction check bits thereby providing a corresponding corrected check bit element;

f. a redundant AND element coupled to said redundant memory array card; said redundant AND element receiving said corresponding corrected check bit element and further receiving a corresponding multiple bit error detection line from said redundant memory array card; said redundant AND element providing said corrected check bit element when said corresponding multiple bit error detection line is not asserted; said redundant AND element providing a predetermined logic level when said corresponding multiple bit error detection line is asserted; and g. an error correction element coupled to said plurality of AND elements, to said redundant AND element, and to said plurality of selection circuits; said error correction element providing a system level corrected portion of the data word to said plurality of selection circuits; a corresponding one of said plurality of selection circuits selecting said system level corrected portion of the data word if said corresponding multiple bit error detection line is asserted and selecting said corresponding corrected data element if said corresponding multiple bit error detection line is not asserted.

6. A memory apparatus according to claim 5 further comprising:

h. an error check circuit coupled to said plurality of multiple bit error detection lines from said plurality of memory array cards; said error check circuit being for asserting an uncorrectable error line if more than one of the plurality of multiple bit error detection lines are asserted.

7. A memory apparatus according to claim 6 wherein said error correction circuit further comprises:

i. at least one XOR element.

8. A memory apparatus according to claim 7 further comprising: j. a disassembling block coupled to said plurality of memory array cards for disassembling the data word into at least one portion; said at least one portion of the data word being provided to corresponding memory array cards.

* * * * *